US011989133B2

(12) United States Patent
Wang et al.

(10) Patent No.: US 11,989,133 B2
(45) Date of Patent: May 21, 2024

(54) LOGICAL-TO-PHYSICAL MAPPING COMPRESSION TECHNIQUES

(71) Applicant: Micron Technology, Inc., Boise, ID (US)

(72) Inventors: Xing Wang, Shanghai (CN); Liping Xu, Shanghai (CN); Xu Zhang, Shanghai (CN); Zhen Gu, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 158 days.

(21) Appl. No.: 17/637,429

(22) PCT Filed: Mar. 16, 2021

(86) PCT No.: PCT/CN2021/081018
§ 371 (c)(1),
(2) Date: Feb. 22, 2022

(87) PCT Pub. No.: WO2022/193120
PCT Pub. Date: Sep. 22, 2022

(65) Prior Publication Data
US 2023/0350808 A1 Nov. 2, 2023

(51) Int. Cl.
*G06F 12/10* (2016.01)
(52) U.S. Cl.
CPC .................... *G06F 12/10* (2013.01)
(58) Field of Classification Search
CPC ........................................................ G06F 12/10
See application file for complete search history.

(56) References Cited

U.S. PATENT DOCUMENTS 7,932,912 B1* 4/2011 Van Dyke ................. G06T 1/60
345/568
2014/0331020 A1* 11/2014 Hendry ................. G06F 3/0604
711/165

(Continued)

FOREIGN PATENT DOCUMENTS

| CN | 105183383 A | 12/2015 |
| CN | 110119361 A | 8/2019 |
| WO | 2016111954 A1 | 7/2016 |

OTHER PUBLICATIONS

ISA/CN, "International Search Report and Written Opinion of the International Searching Authority," issued in connection with Int'l Appl. No. PCT/CN2021/081018, dated Dec. 17, 2021 (9 pages).

*Primary Examiner* — Prasith Thammavong
(74) *Attorney, Agent, or Firm* — Holland & Hart LLP

(57) ABSTRACT

Methods, systems, and devices for logical-to-physical (L2P) mapping compression techniques are described. A memory system may use an L2P mapping to map logical addresses to physical addresses of the memory system. The L2P mapping may be a hierarchical L2P mapping divided into multiple levels or subsets that are used to identify a physical address corresponding to a logical address. The memory system may write data to a set of physical addresses that are consecutively indexed and may set a flag in an entry of a second-level of the L2P mapping (e.g., of a three-level L2P mapping) to indicate that the entry is associated with a starting physical address of the consecutively indexed physical addresses. The memory system may subsequently read the data starting at the starting physical address based on the flag (e.g., bypassing reading an entry of a lowest-level of the L2P mapping to determine the physical address).

25 Claims, 7 Drawing Sheets

(56) References Cited

U.S. PATENT DOCUMENTS

2016/0267012 A1  9/2016  Konuma et al.
2017/0160932 A1* 6/2017  Thakkar .............. G06F 11/1068
2021/0349829 A1* 11/2021 Cariello .............. G06F 12/0246

* cited by examiner

LOGICAL-TO-PHYSICAL MAPPING COMPRESSION TECHNIQUES

CROSS REFERENCE

The present application for patent is a 371 national phase filing of International Patent Application No. PCT/CN2021/081018 by Wang et al., entitled "LOGICAL-TO-PHYSICAL MAPPING COMPRESSION TECHNIQUES," filed Mar. 16, 2021, assigned to the assignee hereof, and expressly incorporated by reference herein.

FIELD OF TECHNOLOGY

The following relates generally to one or more systems for memory and more specifically to logical-to-physical mapping compression techniques.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAIVI), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
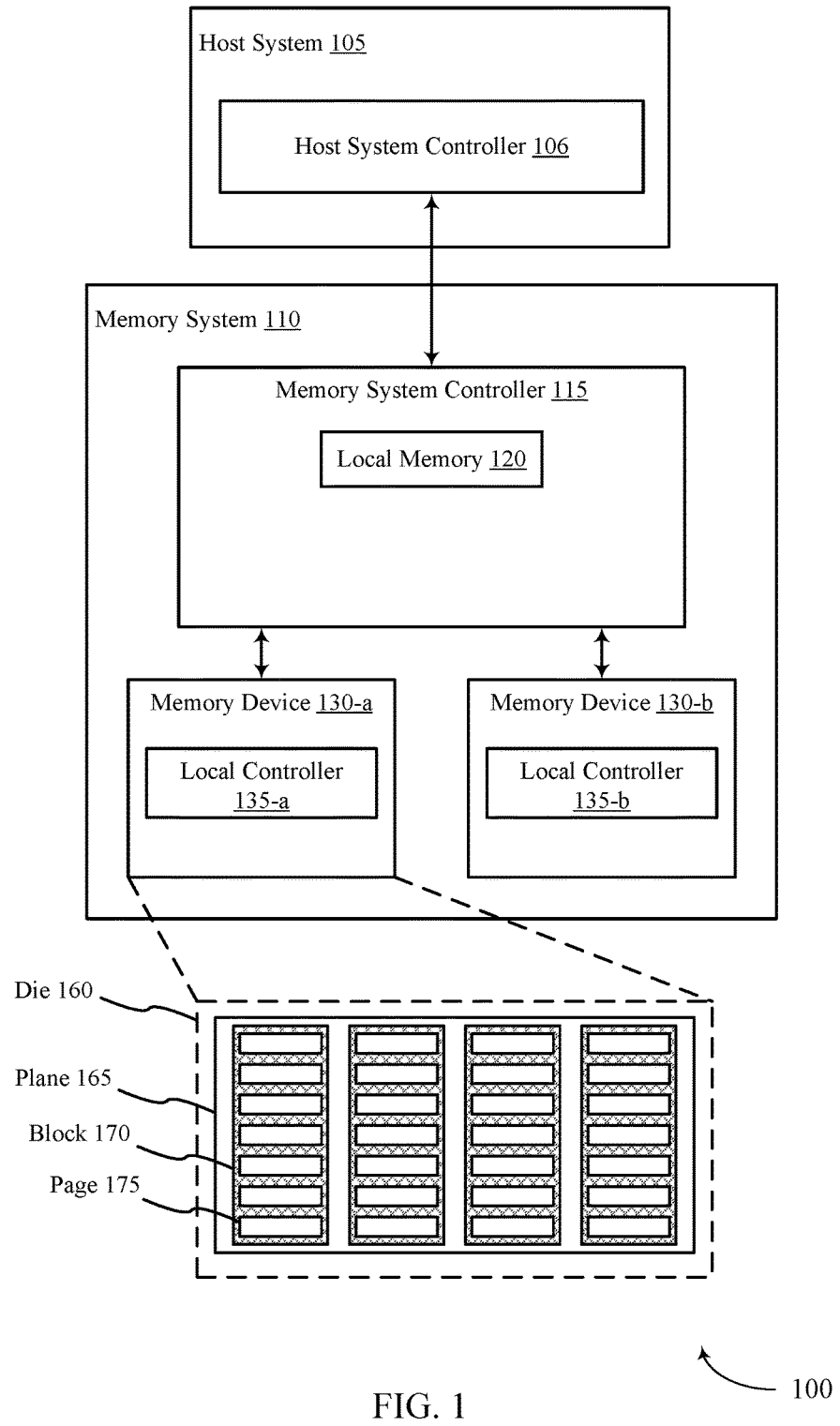
FIG. 1 illustrates an example of a system that supports logical-to-physical (L2P) mapping compression techniques in accordance with examples as disclosed herein.

Memory devices of a memory system may store data at a corresponding physical address, where a physical address may identify a physical location of a corresponding memory cell (e.g., or a page of memory cells) within a memory device. The physical location of data within the memory device may change over time due to the memory device accommodating the writing of additional data, maintenance operations performed by the memory device (e.g., garbage collection operations), or for other reasons. A host system coupled with the memory system may reference data (e.g., if issuing read, write, or other commands associated with the data) using logical addresses (e.g., logical block addresses (LBAs), virtual addresses, system addresses, or other logical addresses), and the memory device (e.g., or the memory system) may generate and maintain a logical-to-physical (L2P) mapping between the logical addresses used in the communications and the physical addresses of the memory cells at which the data is stored, which may support the memory device changing the physical addresses over time.

A memory system may use a hierarchical L2P mapping that is divided into multiple levels or subsets to map a logical address to a corresponding physical address. The memory system may use the hierarchical L2P mapping to progressively translate a logical block address into the corresponding physical address. For example, a three-level L2P mapping may be divided into a relatively small first level (e.g., or subset) that may include entries that point to different locations of a second level (e.g., or subset). Entries of the second level may point to different locations of a third level (e.g., or subset), and entries of the third level may point to physical addresses of pages of data stored in a memory device of the memory system. Thus, to access data stored in the memory device, the memory system may navigate through the three levels to identify the location of a requested page of data. Such an approach may allow for the relatively small first level to be stored in a volatile memory device of the memory system for fast accesses and updates, but may increase read latency by introducing additional operations, such as two additional reads (e.g., for reading entries in the first-level table and second-level table) to identify the physical address of the data.

Techniques, systems, and devices are described herein for increasing performance and reducing latency associated with using L2P mappings by setting second level entries of L2P mappings to identify physical addresses of data, thereby bypassing the reading of a third level entry of the L2P mapping. For example, a memory system receive a write command for a set of addresses (e.g., either logical block addresses or physical addresses) that are consecutively indexed and may write data to the set of addresses in response to receiving the write command. The memory system may update the L2P mapping such that a subsequent read of the data may skip reading a third level entry of the L2P mapping. For example, the memory system may set a second level entry of the L2P mapping to indicate (e.g., include) a starting physical address of the set of physical addresses used to store the data associated with the write command. Additionally, the memory system may set a flag in the second level entry to indicate that the second level entry indicates the starting physical address. Accordingly, in response to receiving a read command that includes an LBA corresponding to the data, the memory system may traverse a first level of the L2P mapping and the second level to locate and read the data without reading a third level entry. For example, the memory system may read a first level entry corresponding to the LBA and may identify the second level entry based on the first level entry and the LBA. The memory system may read the second level entry and may identify that the second level entry indicates the starting physical address of the data based on the flag. The memory system may then read the data starting at the starting physical address and may transmit the data to a host system coupled with the memory system. In this way, the memory system may reduce latency associated with using L2P mappings to locate data stored at consecutively indexed physical addresses by eliminating the reading of third level entries to locate the data.

Features of the disclosure are initially described in the context of a system with reference to FIG. 1. Features of the disclosure are further described in the context of an entry diagram and process flows with reference to FIGS. 2-4. These and other features of the disclosure are further illustrated by and described in the context of an apparatus diagram and flowcharts that relate to L2P mapping compression techniques with reference to FIGS. 5-7.

FIG. 1 illustrates an example of a system 100 that supports L2P mapping compression techniques in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages 175 of the new block 170. The memory device 130 (e.g., the local controller 135) or the memory system controller 115 may mark or otherwise designate the data that remains in the old block 170 as invalid or obsolete and may update an L2P mapping to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping may be stored within the memory cells of the memory device 130 (e.g., within one or more blocks 170 or planes 165) for use (e.g., reference and updating) by the local controller 135 or memory system controller 115.

In some cases, L2P mappings may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

In some examples, the L2P mapping may be a hierarchical L2P mapping that is divided into multiple levels or subsets to map a logical address to a corresponding physical address. For example, the L2P mapping may be a three-level L2P mapping in which the memory system controller 115 (e.g., or the local controller 135) identifies an entry of a first level (e.g., or subset) of the L2P mapping that corresponds to an LBA included in a command to access data, identifies an entry of a second level of the L2P mapping using the entry of the first level, identifies an entry of a third level of the L2P mapping using the entry of the second level, and identifies a physical address of data (e.g., of a page 175) using the entry of the third level. Accordingly, in response to receiving a read command to read data stored in a memory device 130, in some cases, the memory system controller 115 (e.g., or the local controller 135) may traverse the levels of the L2P mapping to locate the physical address(es) of the data, read the data, and transmit the data to the host system 105.

The memory system controller 115 may reduce a latency associated with using a hierarchical L2P mapping by being capable of configuring second level entries of the L2P mapping to indicate either a third level entry or the physical address(es) of the data, thereby eliminating the reading of a third level entry of the L2P mapping in some cases. For example, the memory system 110 may receive a write command (e.g., from the host system controller 106, at the memory system controller 115, at a local controller 135) for a set of addresses (e.g., logical block addresses or physical addresses) that are consecutively indexed and may write data to the set of addresses in response to receiving the write command. The memory system 110 may update (e.g., using the memory system controller 115 or the local controller 135) the L2P mapping such that a subsequent read of the data may skip reading a third level entry of the L2P mapping. For example, the memory system 110 may set a second level entry of the L2P mapping to indicate (e.g., include) a starting physical address of the set of physical addresses. Additionally, the memory system 110 may set a flag in the second level entry to indicate that the second level entry indicates the starting physical address. Accordingly, in response to receiving a read command that includes an LBA associated with the data, the memory system 110 may traverse the first level and the second level to locate and read the data without reading a third level entry. For example, the memory system 110 may read a first level entry corresponding to the LBA and may identify the second level entry based on the first level entry and the LBA. The memory system 110 may read the second level entry and may identify that the second level entry indicates the starting physical address of the data based on the flag. The memory system 110 may then read the data starting at the starting physical address and may transmit the data to the host system 105.

The system 100 may include any quantity of non-transitory computer readable media that support L2P mapping compression techniques. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is an MNAND system.

Figure 2:
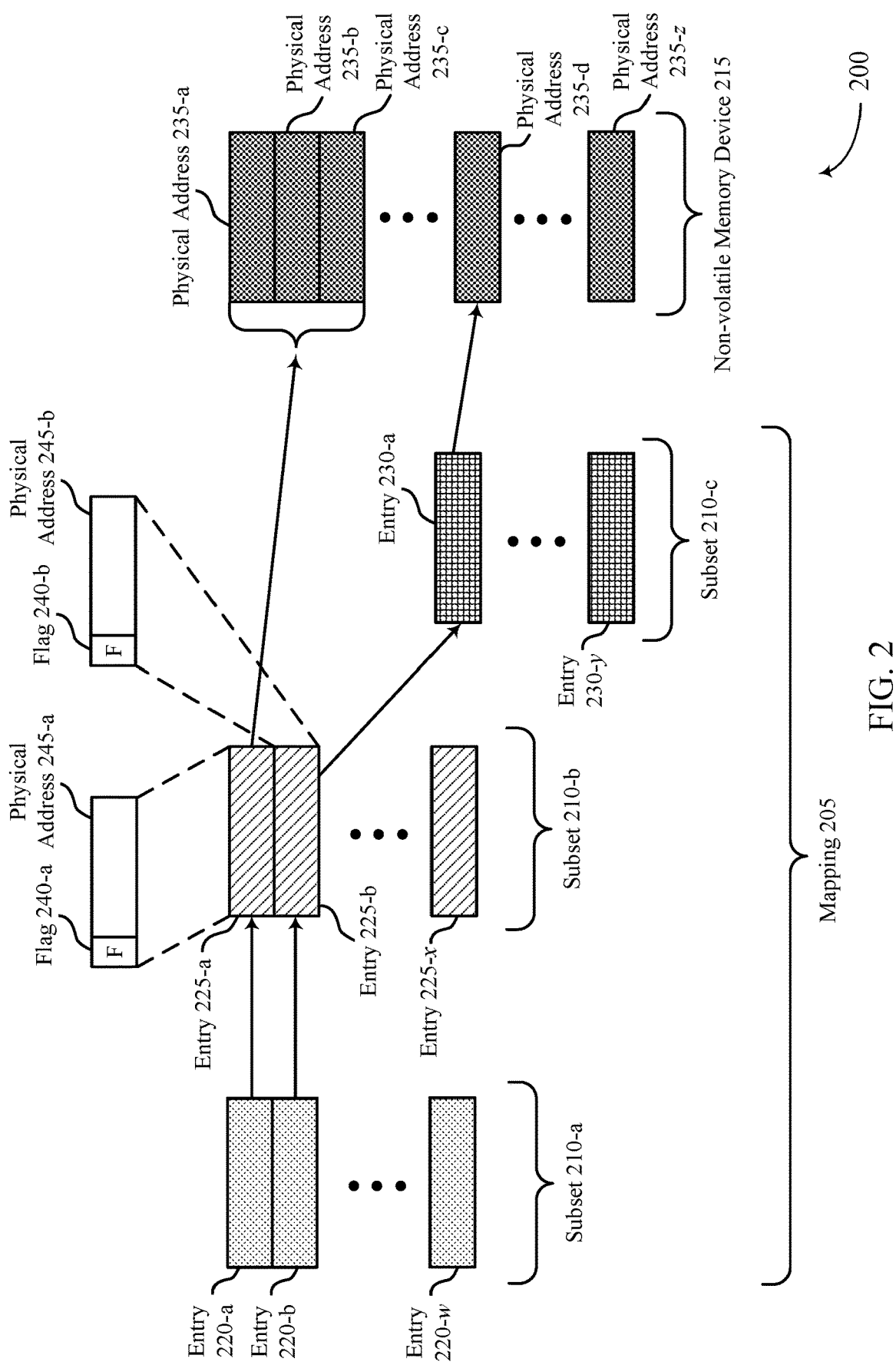
FIG. 2 illustrates an example of an entry diagram that supports L2P mapping compression techniques in accordance with examples as disclosed herein.

FIG. 2 illustrates an example of an entry diagram 200 that supports L2P mapping compression techniques in accordance with examples as disclosed herein. The entry diagram 200 may implement aspects of a system 100, as described with reference to FIG. 1. For example, the entry diagram 200 may be implemented by a controller, such as a memory system controller 115 or a local controller 135, or a memory device, such as a memory device 130, or both, as described with reference to FIG. 1. The entry diagram 200 may be implemented to reduce latency and power consumption and increase performance of a memory system, among other benefits.

The entry diagram 200 depicts a mapping 205 which may correspond to an L2P mapping as described herein. For example, the mapping 205 may be an example of a hierarchical L2P mapping that is divided into multiple subsets 210. The mapping 205 may include at least a subset 210-a, a subset 210-b, and a subset 210-c. The controller may maintain the mapping 205 to map LBAs generated by a host system coupled with the memory system to physical addresses 235 (e.g., page addresses) of a non-volatile memory device 215 (e.g., a memory device 130 that includes non-volatile memory cells, a NAND device) of the memory system.

The subset 210-a may include entries 220-a up to 220-w, where w is some positive integer. In some cases, the subset 210-a may include a relatively small quantity of entries 220 (e.g., w may be a relatively small positive integer) such that the controller may store the subset 210-a in a volatile memory device (e.g., local memory 120, a memory device 130 that includes volatile memory cells, an SRAM device) of the memory system to allow for faster accesses and updates.

The subset 210-b may include entries 225-a up to 225-x, where x is some positive integer. In some examples, the subset 210-b may include a relatively large quantity of entries 225 (e.g., x may be a relatively large positive integer) such that the controller may store the subset 210-b in the non-volatile memory device 215 (e.g., at physical addresses 235 not shown). Accordingly, in order to read an entry 225 of the subset 210-b, the controller may transfer a portion of the subset 210-b that includes the entry 225 from the non-volatile memory device 215 to the volatile memory device. After reading the entry 225, the controller may transfer the portion of the subset 210-b back to non-volatile memory device 215.

The subset 210-c may include entries 230-a up to 230-y, where y is some positive integer. In some examples, the subset 210-c may include a relatively large quantity of entries 230 (e.g., y may be a relatively large positive integer) such that the controller may store the subset 210-c in the non-volatile memory device 215 (e.g., at physical addresses 235 not shown). Accordingly, in order to read an entry 230 of the subset 210-c, the controller may transfer a portion of the subset 210-c that includes the entry 230 from the non-volatile memory device 215 to the volatile memory device. After reading the entry 230 the controller may transfer the portion of the subset 210-c back to the non-volatile memory device 215.

In some examples, each subset 210 may be an individual L2P mapping table stored in the memory system. For example, the subset 210-a may be a first level L2P mapping table that is stored in the volatile memory device. Here, each entry 220 may point to a different second level L2P table. For example, the subset 210-b may include multiple second level L2P tables that each include a corresponding set of entries 225. Here, the controller may use an entry 220 and an offset (e.g., indicated by an LBA) to determine the corresponding entry 225 within the second level L2P table pointed to by the entry 220. Additionally, in some cases, each entry 225 may point to a different third level L2P table. For example, the subset 210-c may include multiple third level L2P tables that each include a corresponding set of entries 230. Here, the controller may use the entry 225 and a second offset (e.g., indicated by the LBA) to determine the corresponding entry 230 within the third level L2P table pointed to by the entry 225.

The subset 210-a may correspond to a first level of the mapping 205, the subset 210-b may correspond to a second level of the mapping 205, and the subset 210-c may correspond to a third level of the mapping 205. For example, the controller may use an LBA to identify an entry 220 of the subset 210-a, the entry 220 to identify an entry 225 of the subset 210-b, the entry 225 to identify an entry 230 of the subset 210-c, and the entry 230 to identify a physical address 235 corresponding to the LBA. That is, to identify the corresponding physical address 235, the controller may, in some cases, traverse the first level, second level, and third level of the mapping 205. However, traversing the three levels of the mapping 205 may include transferring portions of the subset 210-b and the subset 210-c to the volatile memory device to read an entry 225 and an entry 230. Each entry of the mapping 205 that is read and portion of a subset 210 that is transferred may increase a latency associated with using the mapping 205 (e.g., to identify the corresponding physical address 235). Accordingly, techniques to reduce a quantity of entries of the mapping 205 that are read and portions of subsets 210 that are transferred may reduce the latency associated with the using the mapping 205.

The controller may reduce a quantity of entries of the mapping 205 that are read and, by extension, a quantity of portions of subsets 210 that are transferred to the volatile memory device by setting an entry 225 to indicate a physical address 235 rather than an entry 230. For example, if data is stored in a set of physical addresses 235 that are consecutively indexed, the controller may set an entry 225 to indicate a starting physical address 235 of the set of consecutively indexed physical addresses 235. For example, data corresponding to a first LBA may be stored at a set of consecutively indexed physical addresses 235 that includes at least a physical address 235-a, a physical address 235-b, and a physical address 235-c, where the physical address 235-a is a starting physical address of the set of consecutively indexed physical addresses 235.

The controller may set an entry 225-a to indicate the physical address 235-a. For example, each entry 225 may include a flag 240 and a physical address 245. The flag 240 may indicate whether the entry 225 is associated with an entry 230 or is associated with a starting physical address 235 of a set of consecutively indexed physical addresses 235. Based on the flag 240, the physical address 245 may correspond to either a physical address of the entry 230 or the starting physical address. Accordingly, in the example of FIG. 2, the controller may set the flag 240-*a* of the entry 225-*a* to indicate that the entry 225-*a* corresponds to the set of consecutively indexed physical addresses 235. Additionally, the controller may set the physical address 245-*a* of the entry 225-*a* to indicate the starting physical address 235-*a*. In this way, the controller may set the entry 225-*a* to refrain from (e.g., skip) reading and transferring a portion of the subset 210-*c* that includes an entry 230. For example, controller may receive a read command that includes the first LBA (e.g., from the host system). The controller may use the first LBA to identify and read the entry 220-*a* which the controller may use to identify and read the entry 225-*a*. The controller may determine that the physical address 245-*a* indicates the starting physical address 235-*a* based on the flag 240-*a* and may read the data corresponding to the first LBA starting at the physical address 235-*a*. The controller may then transmit the data to the host system.

Alternatively, data may be stored at a set of physical addresses 235 that includes one or more physical addresses 235 that are non-consecutive with other physical addresses 235 of the set. For example, data corresponding to a second LBA may be stored at a set of physical addresses 235 that includes at least a non-consecutive physical address 235-*d*. Accordingly, the controller may set the flag 240-*b* of the entry 225-*b* to indicate that the entry 225-*b* is associated with (indicates the physical address of) an entry 230 (e.g., an entry 230-*a*). Additionally, the controller may set the physical address 245-*b* of the entry 225-*b* to indicate (e.g., to include the physical address of) the entry 230-*a* and may set the entry 230-*a* to indicate the physical address 235-*d*. Accordingly, in response to receiving a read command that includes the second LBA, the controller may use the second LBA to identify and read the entry 220-*b* which the controller may use to identify and read the entry 225-*b*. The controller may determine that the physical address 245-*b* indicates the physical address of the entry 230-*a* based on the flag 240-*b*. Accordingly, the controller may identify and read the entry 230-*a* to identify the physical address 235-*d* and read the data corresponding to the second LBA stored at the physical address 235-*d*. The controller may then transmit the data to the host system.

Figure 3:
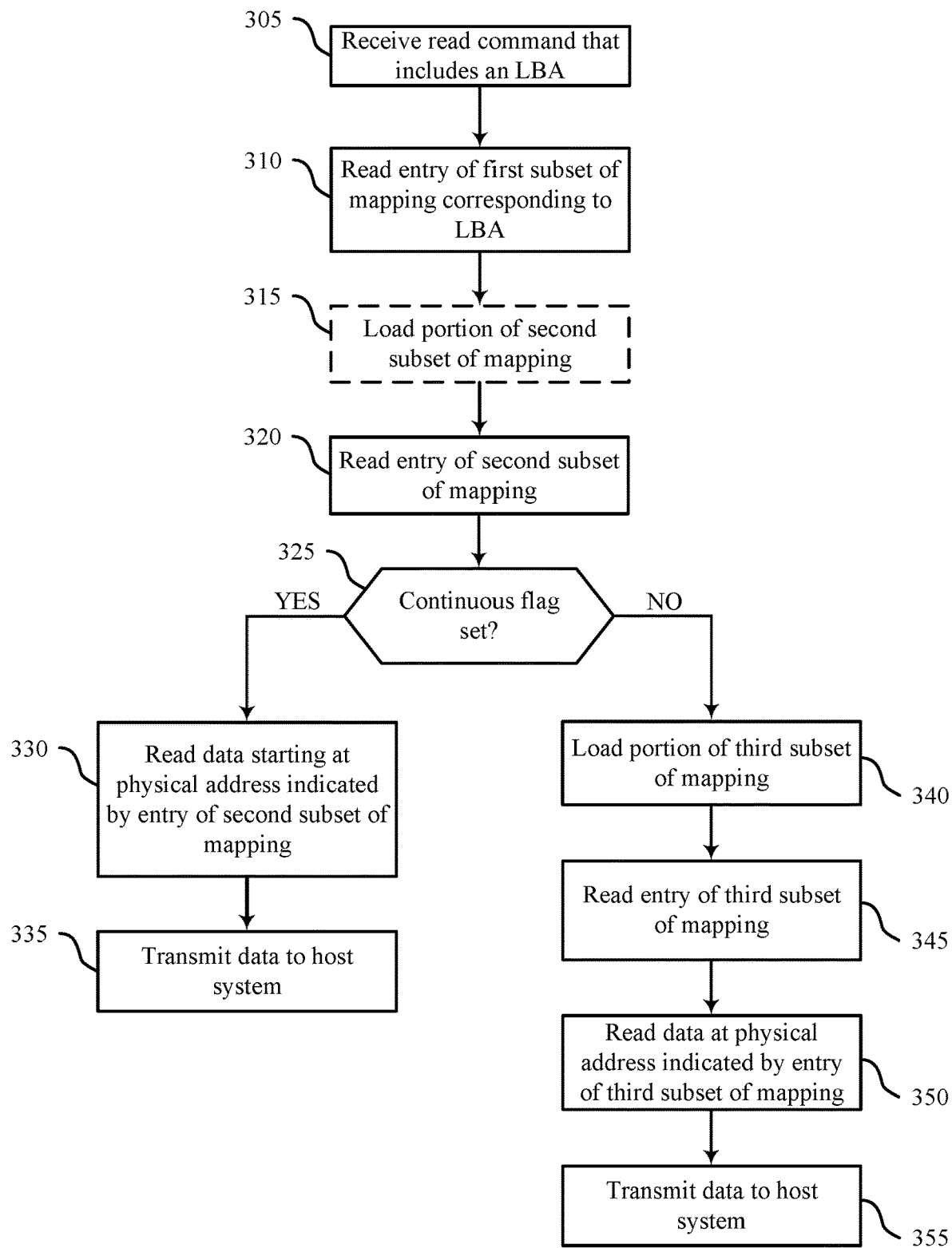
FIGS. 3 and 4 illustrate examples of process flows that support L2P mapping compression techniques in accordance with examples as disclosed herein.

FIG. 3 illustrates an example of a process flow 300 that supports L2P mapping compression techniques in accordance with examples as disclosed herein. Process flow 300 may be performed by components of a memory system, such as memory system 110 described with reference to FIG. 1. For example, process flow 300 may be performed by a controller of a memory system or a memory device (or both) such as a memory system controller 115 or a local controller 135 as described with reference to FIG. 1. Process flow 300 may depict a process for reading data based on whether physical addresses storing the data are consecutively indexed that may be implemented to reduce latency and power consumption and increase system performance, among other benefits. Aspects of the process flow 300 may be implemented by a controller, among other components. Additionally or alternatively, aspects of the process flow 300 may be implemented as instructions stored in memory (e.g., firmware stored in a memory coupled with the memory system controller 115 or the local controller 135). For example, the instructions, if executed by a controller (e.g., a memory system controller 115, a local controller 135), may cause the controller to perform the operations of the process flow 300.

In the following description of the process flow 300, the operations may be performed in different orders or at different times. Some operations may also be omitted from the process flow 300, and other operations may be added to the process flow 300.

At 305, a read command that includes an LBA may be received. For example, the controller may receive the read command from a host system coupled with the controller to read data that corresponds to the LBA.

At 310, an entry of a first subset (e.g., level) of a mapping that corresponds to the LBA may be read. For example, the controller may identify the entry of the first subset based on the LBA and may read the entry of the first subset.

At 315, a portion of a second subset (e.g., level) of the mapping may optionally be loaded into a volatile memory device of the memory system. For example, the entry of the first subset may indicate an entry of the second subset. In some examples, the second subset may be stored in a non-volatile memory device, for example, due to a storage capacity of the volatile memory device. In order to read entries of the second subset, the controller may transfer (e.g., load) portions of the second subset that include the entries to be read from the non-volatile memory device to the volatile memory device. Accordingly, at 315, the controller may determine whether a portion of the second subset that includes the entry of the second subset indicated by the entry of the first subset is already loaded into the volatile memory device. If the portion of the second subset is already loaded, the controller may proceed to 320. Alternatively, if the portion of the second is not loaded, the controller may load the portion of the second subset and proceed to 320.

At 320, the entry of the second subset may be read. For example, based on reading the entry of the first subset, the controller may read the entry of the second subset. The entry of the second subset may include a flag that indicates whether the entry of the second subset is associated with an entry of a third subset (e.g., level) of the mapping or is associated with a starting physical address of a set of consecutively indexed physical addresses. Additionally, the entry of the second subset may include a physical address that corresponds to either a physical address of the entry of the third subset or the starting physical address based on the flag.

At 325, the flag of the entry of the second subset may be evaluated. For example, the controller may evaluate (e.g., read a bit of the entry of the second subset corresponding to) the flag to determine whether the entry of the second subset is associated with (e.g., indicates) the entry of a third subset or is associated with (e.g., indicates) the starting physical address.

If, at 325, the controller determines that the flag indicates that the entry of the second subset indicates the starting physical address, the controller may perform 330 through 335, as follows.

At 330, the data corresponding to the LBA may be read starting the starting physical address indicated by the entry of the second subset. For example, the controller may determine that the entry of the second subset indicates or includes the starting physical address based on the flag. Accordingly, the controller may read the data starting at the starting physical address.

At 335, the data may be transmitted to the host system. For example, the controller may transmit the read data to the host system.

If, at 325, the controller determines that the flag indicates that the entry of the second subset indicates the entry of the third subset, the controller may perform 340 through 355, as follows.

At 340, a portion of the third subset that includes the entry of the third subset may be loaded into the volatile memory device. For example, based on the flag indicating that the entry of the second subset indicates the entry of the third subset, the controller may load the portion of the third subset that includes the indicated entry of the third subset into the volatile memory device.

At 345, the entry of the third subset may be read. For example, after loading the portion of the third subset into the volatile memory device, the controller may read the entry of the third subset. The entry of the third subset may include a physical address of the data corresponding to the LBA.

At 350, the data at the physical address indicated by the entry of the third subset may be read. For example, the controller may determine the physical address of the data based on reading the entry of the third subset and may read the data stored at the physical address.

At 355, the data may be transmitted to the host system. For example, the controller may transmit the data stored at the physical address to the host system.

Figure 4:
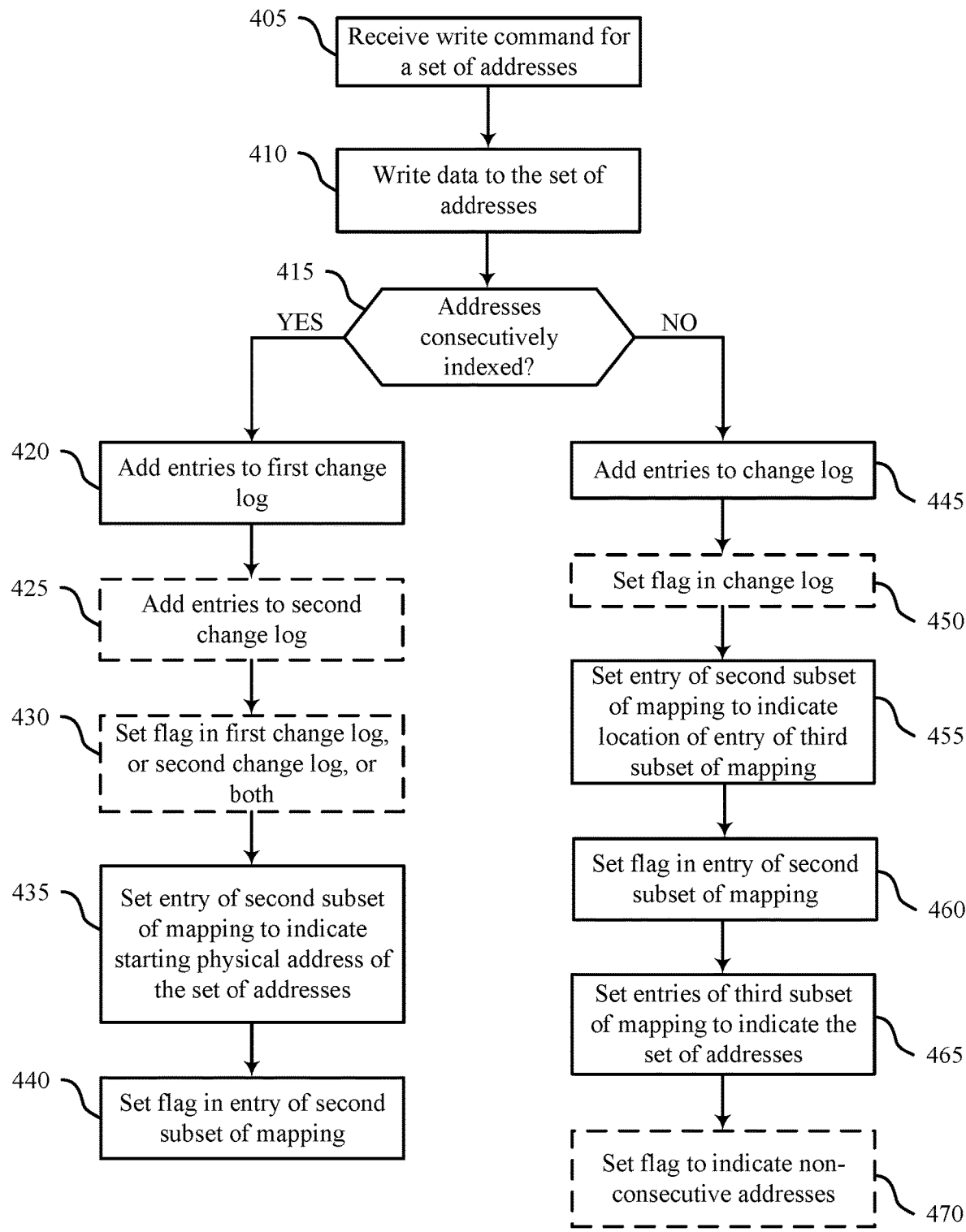

FIG. 4 illustrates an example of a process flow 400 that supports L2P mapping compression techniques in accordance with examples as disclosed herein. Process flow 400 may be performed by components of a memory system, such as memory system 110 described with reference to FIG. 1. For example, process flow 400 may be performed by a controller of a memory system or a memory device (or both) such as a memory system controller 115 or a local controller 135 as described with reference to FIG. 1. Process flow 400 may depict a process for reading data based on whether physical addresses storing the data are consecutively indexed that may be implemented to reduce latency and power consumption and increase system performance, among other benefits. Aspects of the process flow 400 may be implemented by a controller, among other components. Additionally or alternatively, aspects of the process flow 400 may be implemented as instructions stored in memory (e.g., firmware stored in a memory coupled with the memory system controller 115 or the local controller 135). For example, the instructions, if executed by a controller (e.g., a memory system controller 115, a local controller 135), may cause the controller to perform the operations of the process flow 400.

In the following description of the process flow 400, the operations may be performed in different orders or at different times. Some operations may also be omitted from the process flow 400, and other operations may be added to the process flow 400.

At 405, a write command for a set of addresses may be received (e.g., logical block addresses or physical addresses). For example, the controller may receive the write command from a host system coupled with the controller to write data to the set of physical addresses. The write command may include one or more LBAs that the controller may subsequently use to read the data from a set of physical addresses.

At 410, the controller may write the data to the set of physical addresses. Writing the data to the set of physical addresses may occur before, concurrently with, or after updating the L2P mapping. Such location of the writing feature in the process flow is for illustrative purposes.

At 415, the set of addresses may be evaluated as to whether it is a set of consecutively indexed addresses (e.g., consecutively indexed logical block addresses or consecutively indexed physical addresses). For example, the controller may determine whether addresses of the set of addresses are consecutively indexed. If, at 415, the controller determines that the addresses are consecutively indexed, the controller may perform 420 through 440, as follows.

At 420, a first set of entries may be added to a first change log associated with a mapping that defines a relationship between the one or more LBAs and the set of physical addresses (e.g., an L2P mapping that includes a first subset or level, a second subset or level, and a third subset or level). For example, the controller may use a change log stored in a volatile memory device of the memory system to group updates to the mapping. For example, in response to writing the data to the set of physical addresses, the controller may update the mapping to include a mapping of the one or more LBAs to the set of physical addresses. To update the mapping, the controller may load portions of subsets of the mapping into the volatile memory device to update corresponding entries to map the one or more LBAs to the set of physical addresses. Accordingly, to reduce a quantity of times that portions of the subsets of the mapping are loaded into the volatile memory device, the controller may use a change log to group updates to the mapping, where entries of the change log indicate updates to corresponding entries of the volatile memory device. Therefore, at 420, the controller may add the first set of entries to the first change log in response to writing the data to the set of physical addresses.

At 425, a second set of entries may optionally be added to a second change log associated with the mapping. For example, in some cases, the controller may add entries to the first change log such that the first change log is filled. However, updating the mapping as part of the writing the data to the set of physical addresses may include adding additional entries to a change log. Accordingly, at 425, the controller may optionally add the second set of entries (e.g., the additional entries) to the second change log if the first change log is filled at 420.

At 430, a flag in the first change log, or the second change log, or both, may be set to indicate whether addresses associated with the first set of entries of the first change log (e.g., logical block addresses or physical addresses) are consecutive with addresses associated with the second set of entries of the second change log (e.g., logical block addresses or physical addresses). For example, because the controller determines that the set of addresses are consecutively indexed at 415, the second set of entries of the second change log may indicate updates to addresses that are consecutively indexed with the addresses that first set of entries of the first change log indicate to be updated. Accordingly, if at 425, the controller adds the second set of entries to the second change log, the controller may set a flag in the first change log, or the second change log, or both, to indicate that the addresses associated with the first set of entries of the first change log are consecutive with addresses associated with the second set of entries of the second change log.

At 435, an entry of the second subset of the mapping may be set to indicate a starting physical address of the set of addresses. For example, based on determining that the addresses are consecutively indexed, the controller may set the entry of the second subset to indicate or include the starting physical address.

At 440, a flag in the entry of the second subset may be set to indicate that the entry of the second subset is associated with a set of consecutively indexed addresses (e.g., logical block addresses or physical addresses). For example, based on determining that the addresses are consecutively indexed, the controller may set the flag to indicate that the entry of the second subset is associated with the set of consecutively indexed addresses and therefore indicates or includes the starting physical address of the set of consecutively indexed physical addresses.

If, at 415, the controller determines that one or more addresses of the set of addresses are non-consecutive with other addresses of the set of addresses, the controller may perform 445 through 470, as follows.

At 445, a set of entries may be added to a change log associated with the mapping. For example, in response to writing the data to the set of physical addresses, the controller may add the set of entries to the change log that indicate updates to corresponding entries of the mapping.

At 450, a flag in the change log may optionally be set to indicate that addresses associated with the set of entries of the change log are non-consecutive with addresses associated a second set of entries of a second change log associated with the mapping.

At 455, an entry of the second subset of the mapping may be set to indicate a location of an entry of the third subset of the mapping. For example, based on determining that one or more of the addresses of the set of addresses are non-consecutive, the controller may set the entry of the second subset to indicate the location (e.g., include the physical address of) the entry of the third subset of the mapping.

At 460, a flag in the entry of the second subset may be set to indicate that the entry of the second subset is associated with the entry of third subset. For example, based on determining that one or more of the addresses of the set of addresses are non-consecutive, the controller may set the flag to indicate that the entry of the second subset is associated with the entry of third subset and therefore indicates or includes the location (e.g., the physical address of) the entry of the third subset of the mapping.

At 465, one or more entries of the third subset may be set to indicate the addresses of the set of addresses. For example, the controller may set the one or more entries of the third subset to indicate the location (e.g., the physical addresses) of the data written to the set of physical addresses in response to receiving the write command.

At 470, a second flag may be set to indicate the one or more non-consecutive addresses (e.g., logical block addresses or physical addresses). For example, the set of physical addresses may include some physical addresses that are consecutively indexed. The controller may set the second flag to indicate which physical addresses of the set of physical addresses are non-consecutive.

Figure 5:
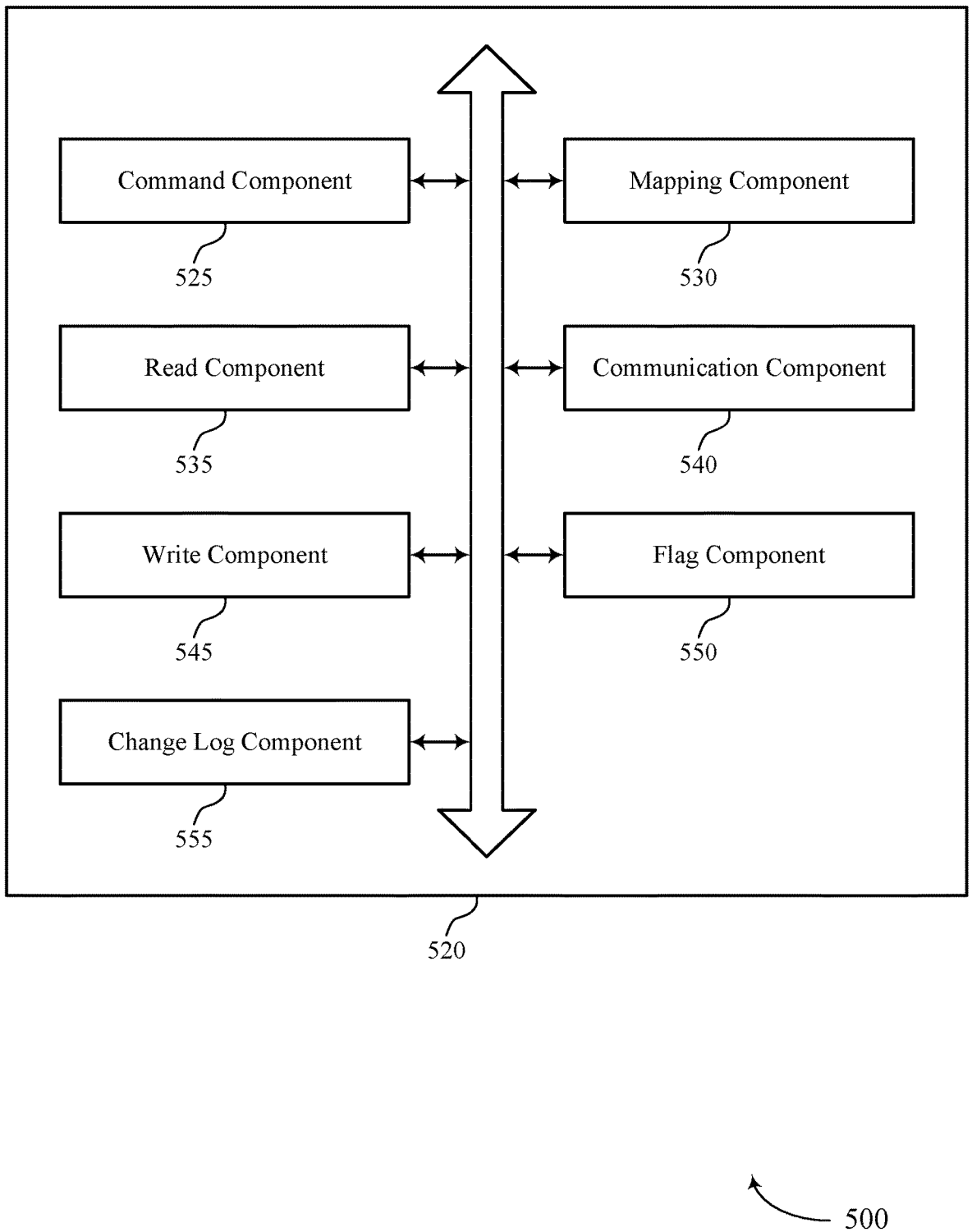
FIG. 5 shows a block diagram of a memory system that supports L2P mapping compression techniques in accordance with examples as disclosed herein.

FIG. 5 shows a block diagram 500 of a memory system 520 that supports L2P mapping compression techniques in accordance with examples as disclosed herein. The memory system 520 may be an example of aspects of a memory system as described with reference to FIGS. 1 through 4. The memory system 520, or various components thereof, may be an example of means for performing various aspects of L2P mapping compression techniques as described herein. For example, the memory system 520 may include a command component 525, a mapping component 530, a read component 535, a communication component 540, a write component 545, a flag component 550, a change log component 555, or any combination thereof. Each of these components may communicate, directly or indirectly, with one another (e.g., via one or more buses).

The command component 525 may be configured as or otherwise support a means for receiving a read command including an LBA. The mapping component 530 may be configured as or otherwise support a means for reading, based at least in part on the LBA, an entry of a first subset of a mapping that defines a relationship between the LBA and a physical address, the entry including a flag that indicates whether the entry is associated with a second subset of the mapping or is associated with a starting physical address of a set of physical addresses associated with the read command. The read component 535 may be configured as or otherwise support a means for reading data associated with the read command starting at the physical address based at least in part on the flag indicating that the entry is associated with the starting physical address. The communication component 540 may be configured as or otherwise support a means for transmitting the data to a host system based at least in part on reading the data.

In some examples, physical addresses of the set of physical addresses are consecutively indexed.

In some examples, the flag is set to indicate that the entry is associated with the starting physical address based at least in part on the physical addresses of the set of physical addresses being consecutively indexed.

In some examples, the mapping component 530 may be configured as or otherwise support a means for transferring, from a non-volatile memory device to a volatile memory device, a portion of the first subset of the mapping including the entry of the first subset of the mapping, where reading the entry of the first subset of the mapping is based at least in part on transferring the portion of the first subset of the mapping.

In some examples, the mapping component 530 may be configured as or otherwise support a means for refraining from reading an entry of the second subset of the mapping based at least in part on the flag indicating that the entry is associated with the starting physical address.

In some examples, the mapping component 530 may be configured as or otherwise support a means for refraining from transferring, from a non-volatile memory device to a volatile memory device, at least a portion of the second subset of the mapping based at least in part on the flag indicating that the entry is associated with the starting physical address.

In some examples, the mapping component 530 may be configured as or otherwise support a means for reading an entry of a third subset of the mapping that corresponds to the LBA, the entry of the third subset of the mapping the LBA to the entry of the first subset of the mapping, where reading the entry of the first subset of the mapping is based at least in part on reading the entry of the third subset of the mapping.

In some examples, the command component 525 may be configured as or otherwise support a means for receiving a second read command including a second LBA. In some examples, the mapping component 530 may be configured as or otherwise support a means for reading, based at least in part on the second LBA, a second entry of the first subset of the mapping that defines a relationship between the second LBA and a second physical address, the second entry including a second flag that indicates whether the second entry is associated with the second subset of the mapping or is associated with a starting physical address of a set of physical addresses associated with the second read command. In some examples, the mapping component 530 may be configured as or otherwise support a means for reading, at the second physical address, an entry of the second subset of the mapping based at least in part on the flag indicating that the entry is associated with the second subset of the mapping, the entry of the second subset of the mapping indicating a location of second data associated with the second read command. In some examples, the read component 535 may be configured as or otherwise support a means for reading the second data based at least in part on reading the entry of the second subset of the mapping. In some examples, the communication component 540 may be configured as or otherwise support a means for transmitting the second data to the host system based at least in part on reading the second data.

In some examples, the mapping includes the first subset, the second subset, and a third subset. In some examples, a first entry of the third subset is identified using the LBA received in the read command, the entry of the first subset is identified using the first entry of the third subset, a second entry of the second subset is identified using the entry of the first subset, and a respective physical address of the memory system is identified using the second entry of the second subset.

In some examples, the command component 525 may be configured as or otherwise support a means for receiving a write command for a set of physical addresses that are consecutively indexed. The write component 545 may be configured as or otherwise support a means for writing data to the set of physical addresses in response to receiving the write command. The flag component 550 may be configured as or otherwise support a means for setting, based at least in part on the set of physical addresses being consecutively indexed, a flag in an entry of a first subset of a mapping that defines a relationship between LBAs and physical addresses, the flag indicating whether the entry of the first subset of the mapping is associated with a second subset of the mapping or is associated with a starting physical address of the set of physical addresses.

In some examples, the mapping component 530 may be configured as or otherwise support a means for setting the entry of the first subset of the mapping to indicate the starting physical address based at least in part on the set of physical addresses being consecutively indexed.

In some examples, the command component 525 may be configured as or otherwise support a means for receiving a read command including an LBA. In some examples, the mapping component 530 may be configured as or otherwise support a means for reading, based at least in part on the LBA, the entry of the first subset of the mapping. In some examples, the read component 535 may be configured as or otherwise support a means for reading the data starting at the starting physical address of the set of physical addresses based at least in part on setting the flag to indicate that the entry is associated with the starting physical address and reading the entry of the first subset of the mapping. In some examples, the communication component 540 may be configured as or otherwise support a means for transmitting the data to a host system based at least in part on reading the data.

In some examples, the change log component 555 may be configured as or otherwise support a means for adding, based at least in part on writing the data to the set of physical addresses, a first set of entries to a first change log associated with updating entries of the mapping and a second set of entries to a second change log associated with updating entries of the mapping. In some examples, the flag component 550 may be configured as or otherwise support a means for setting a second flag in the first change log or the second change log, or both, that indicates whether physical addresses associated with the first set of entries of the first change log are consecutive with physical addresses associated with the second set of entries of the second change log.

In some examples, the command component 525 may be configured as or otherwise support a means for receiving a second write command for a second set of physical addresses, where one or more physical addresses of the second set are non-consecutive with other physical addresses of the second set. In some examples, the write component 545 may be configured as or otherwise support a means for writing second data to the second set of physical addresses in response to receiving the second write command. In some examples, the flag component 550 may be configured as or otherwise support a means for setting a second flag in a second entry of the first subset of the mapping based at least in part on the second set of physical addresses being non-consecutive, the flag indicating that the second entry of the first subset of the mapping is associated with the second subset of the mapping.

In some examples, the mapping component 530 may be configured as or otherwise support a means for setting the second entry of the first subset of the mapping to indicate a location of an entry of the second subset of the mapping based at least in part on the second set of physical addresses being non-consecutive.

In some examples, the flag component 550 may be configured as or otherwise support a means for setting a third flag that identifies the one or more non-consecutive physical addresses.

In some examples, the mapping includes the first subset, the second subset, and a third subset. In some examples, a first entry of the third subset is identified using an LBA received in a read command, the entry of the first subset is identified using the first entry of the third subset, a second entry of the second subset is identified using the entry of the first subset, and a physical address of the memory system is identified using the second entry of the second subset.

Figure 6:
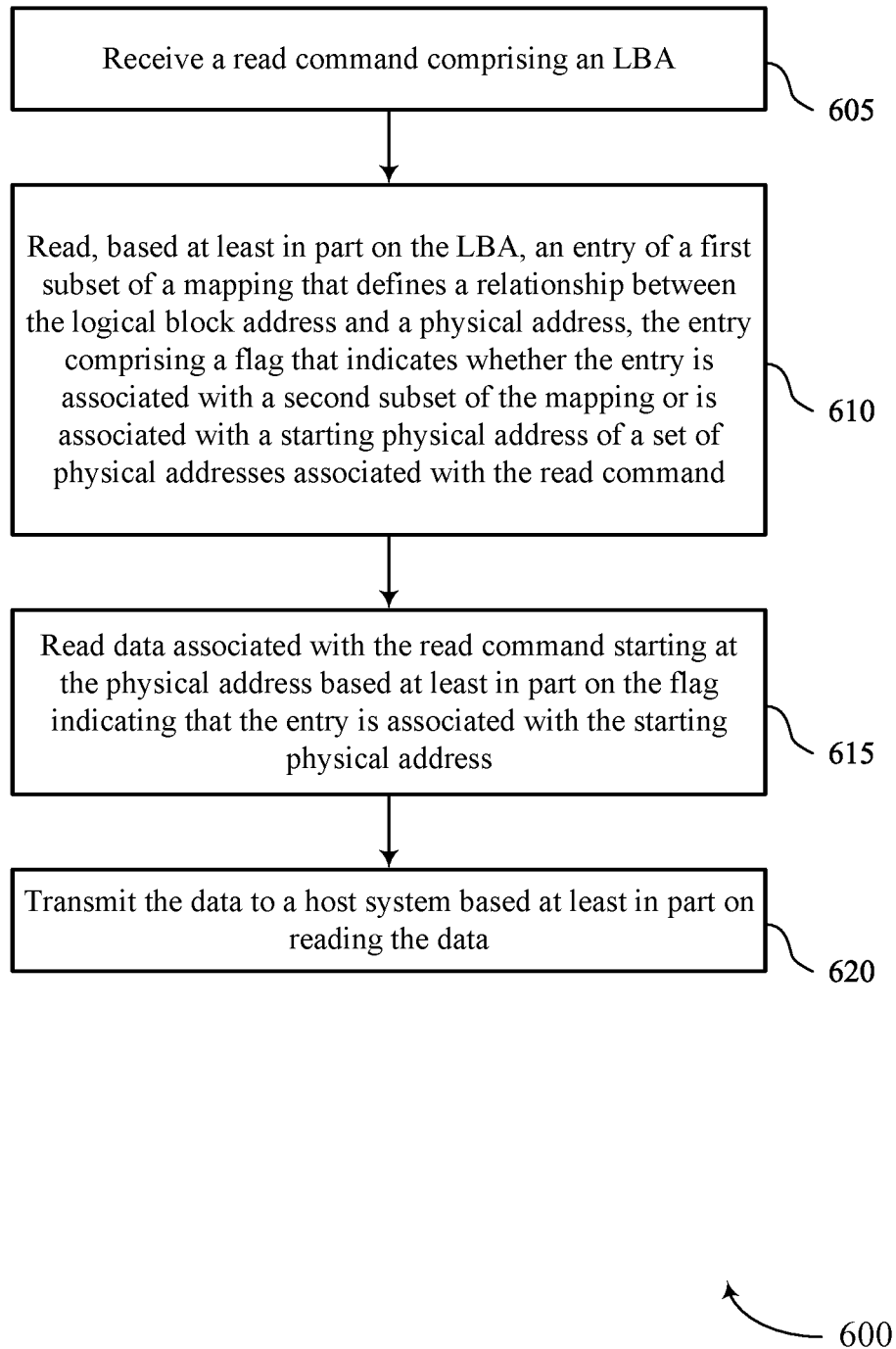
FIGS. 6 and 7 show flowcharts illustrating a method or methods that support L2P mapping compression techniques in accordance with examples as disclosed herein.

FIG. 6 shows a flowchart illustrating a method 600 that supports L2P mapping compression techniques in accordance with examples as disclosed herein. The operations of method 600 may be implemented by a memory system or its components as described herein. For example, the operations of method 600 may be performed by a memory system as described with reference to FIGS. 1 through 5. In some examples, a memory system may execute a set of instructions to control the functional elements of the device to perform the described functions. Additionally or alternatively, the memory system may perform aspects of the described functions using special-purpose hardware.

At 605, the method may include receiving a read command including an LBA. The operations of 605 may be performed in accordance with examples as disclosed herein. In some examples, aspects of the operations of 605 may be performed by a command component 525 as described with reference to FIG. 5.

At 610, the method may include reading, based at least in part on the LBA, an entry of a first subset of a mapping that defines a relationship between the LBA and a physical address, the entry including a flag that indicates whether the entry is associated with a second subset of the mapping or is associated with a starting physical address of a set of physical addresses associated with the read command. The operations of 610 may be performed in accordance with examples as disclosed herein. In some examples, aspects of the operations of 610 may be performed by a mapping component 530 as described with reference to FIG. 5.

At 615, the method may include reading data associated with the read command starting at the physical address based at least in part on the flag indicating that the entry is associated with the starting physical address. The operations of 615 may be performed in accordance with examples as disclosed herein. In some examples, aspects of the operations of 615 may be performed by a read component 535 as described with reference to FIG. 5.

At 620, the method may include transmitting the data to a host system based at least in part on reading the data. The operations of 620 may be performed in accordance with examples as disclosed herein. In some examples, aspects of the operations of 620 may be performed by a communication component 540 as described with reference to FIG. 5.

In some examples, an apparatus as described herein may perform a method or methods, such as the method 600. The apparatus may include, features, circuitry, logic, means, or instructions (e.g., a non-transitory computer-readable medium storing instructions executable by a processor) for receiving a read command including an LBA, reading, based at least in part on the LBA, an entry of a first subset of a mapping that defines a relationship between the LBA and a physical address, the entry including a flag that indicates whether the entry is associated with a second subset of the mapping or is associated with a starting physical address of a set of physical addresses associated with the read command, reading data associated with the read command starting at the physical address based at least in part on the flag indicating that the entry is associated with the starting physical address, and transmitting the data to a host system based at least in part on reading the data.

In some examples of the method 600 and the apparatus described herein, physical addresses of the set of physical addresses may be consecutively indexed.

In some examples of the method 600 and the apparatus described herein, the flag may be set to indicate that the entry may be associated with the starting physical address based at least in part on the physical addresses of the set of physical addresses being consecutively indexed.

Some examples of the method 600 and the apparatus described herein may further include operations, features, circuitry, logic, means, or instructions for transferring, from a non-volatile memory device to a volatile memory device, a portion of the first subset of the mapping including the entry of the first subset of the mapping, where reading the entry of the first subset of the mapping may be based at least in part on transferring the portion of the first subset of the mapping.

Some examples of the method 600 and the apparatus described herein may further include operations, features, circuitry, logic, means, or instructions for refraining from reading an entry of the second subset of the mapping based at least in part on the flag indicating that the entry is associated with the starting physical address.

Some examples of the method 600 and the apparatus described herein may further include operations, features, circuitry, logic, means, or instructions for refraining from transferring, from a non-volatile memory device to a volatile memory device, at least a portion of the second subset of the mapping based at least in part on the flag indicating that the entry is associated with the starting physical address.

Some examples of the method 600 and the apparatus described herein may further include operations, features, circuitry, logic, means, or instructions for reading an entry of a third subset of the mapping that corresponds to the LBA, the entry of the third subset of the mapping the LBA to the entry of the first subset of the mapping, where reading the entry of the first subset of the mapping may be based at least in part on reading the entry of the third subset of the mapping.

Some examples of the method 600 and the apparatus described herein may further include operations, features, circuitry, logic, means, or instructions for receiving a second read command including a second LBA, reading, based at least in part on the second LBA, a second entry of the first subset of the mapping that defines a relationship between the second LBA and a second physical address, the second entry including a second flag that indicates whether the second entry may be associated with the second subset of the mapping or may be associated with a starting physical address of a set of physical addresses associated with the second read command, reading, at the second physical address, an entry of the second subset of the mapping based at least in part on the flag indicating that the entry may be associated with the second subset of the mapping, the entry of the second subset of the mapping indicating a location of second data associated with the second read command, reading the second data based at least in part on reading the entry of the second subset of the mapping, and transmitting the second data to the host system based at least in part on reading the second data.

In some examples of the method 600 and the apparatus described herein, the mapping includes the first subset, the second subset, and a third subset. In some examples of the method 600 and the apparatus described herein, a first entry of the third subset may be identified using the LBA received in the read command, the entry of the first subset may be identified using the first entry of the third subset, a second entry of the second subset may be identified using the entry of the first subset, and a respective physical address of the memory system may be identified using the second entry of the second subset.

Figure 7:
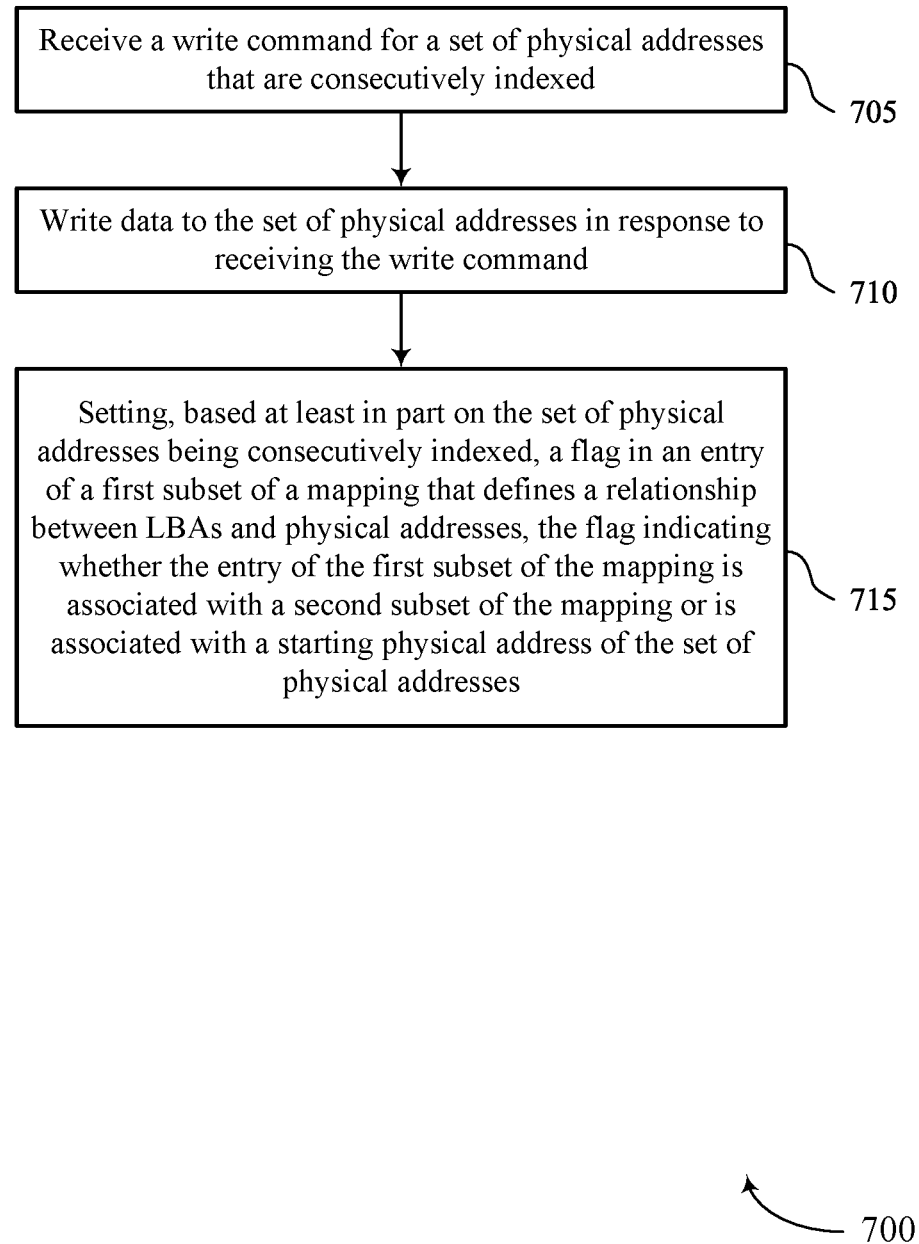

FIG. 7 shows a flowchart illustrating a method 700 that supports L2P mapping compression techniques in accordance with examples as disclosed herein. The operations of method 700 may be implemented by a memory system or its components as described herein. For example, the operations of method 700 may be performed by a memory system as described with reference to FIGS. 1 through 5. In some examples, a memory system may execute a set of instructions to control the functional elements of the device to perform the described functions. Additionally or alternatively, the memory system may perform aspects of the described functions using special-purpose hardware.

At 705, the method may include receiving a write command for a set of physical addresses that are consecutively indexed. The operations of 705 may be performed in accordance with examples as disclosed herein. In some examples, aspects of the operations of 705 may be performed by a command component 525 as described with reference to FIG. 5.

At 710, the method may include writing data to the set of physical addresses in response to receiving the write command. The operations of 710 may be performed in accordance with examples as disclosed herein. In some examples, aspects of the operations of 710 may be performed by a write component 545 as described with reference to FIG. 5.

At 715, the method may include setting, based at least in part on the set of physical addresses being consecutively indexed, a flag in an entry of a first subset of a mapping that defines a relationship between LBAs and physical addresses, the flag indicating whether the entry of the first subset of the mapping is associated with a second subset of the mapping or is associated with a starting physical address of the set of physical addresses. The operations of 715 may be performed in accordance with examples as disclosed herein. In some examples, aspects of the operations of 715 may be performed by a flag component 550 as described with reference to FIG. 5.

In some examples, an apparatus as described herein may perform a method or methods, such as the method 700. The apparatus may include, features, circuitry, logic, means, or instructions (e.g., a non-transitory computer-readable medium storing instructions executable by a processor) for receiving a write command for a set of physical addresses that are consecutively indexed, writing data to the set of physical addresses in response to receiving the write command, and setting, based at least in part on the set of physical addresses being consecutively indexed, a flag in an entry of a first subset of a mapping that defines a relationship between LBAs and physical addresses, the flag indicating whether the entry of the first subset of the mapping is associated with a second subset of the mapping or is associated with a starting physical address of the set of physical addresses.

Some examples of the method 700 and the apparatus described herein may further include operations, features, circuitry, logic, means, or instructions for setting the entry of the first subset of the mapping to indicate the starting physical address based at least in part on the set of physical addresses being consecutively indexed.

Some examples of the method 700 and the apparatus described herein may further include operations, features, circuitry, logic, means, or instructions for receiving a read command including an LBA, reading, based at least in part on the LBA, the entry of the first subset of the mapping, reading the data starting at the starting physical address of the set of physical addresses based at least in part on setting the flag to indicate that the entry may be associated with the starting physical address and reading the entry of the first subset of the mapping, and transmitting the data to a host system based at least in part on reading the data.

In some examples of the method 700 and the apparatus described herein, adding, based at least in part on writing the data to the set of physical addresses, a first set of entries to a first change log associated with updating entries of the mapping and a second set of entries to a second change log associated with updating entries of the mapping and setting a second flag in the first change log or the second change log, or both, that indicates whether physical addresses associated with the first set of entries of the first change log may be consecutive with physical addresses associated with the second set of entries of the second change log.

Some examples of the method 700 and the apparatus described herein may further include operations, features, circuitry, logic, means, or instructions for receiving a second write command for a second set of physical addresses, where one or more physical addresses of the second set may be non-consecutive with other physical addresses of the second set, writing second data to the second set of physical addresses in response to receiving the second write command, and setting a second flag in a second entry of the first subset of the mapping based at least in part on the second set of physical addresses being non-consecutive, the flag indicating that the second entry of the first subset of the mapping may be associated with the second subset of the mapping.

Some examples of the method 700 and the apparatus described herein may further include operations, features, circuitry, logic, means, or instructions for setting the second entry of the first subset of the mapping to indicate a location of an entry of the second subset of the mapping based at least in part on the second set of physical addresses being non-consecutive.

Some examples of the method 700 and the apparatus described herein may further include operations, features, circuitry, logic, means, or instructions for setting a third flag that identifies the one or more non-consecutive physical addresses.

In some examples of the method 700 and the apparatus described herein, the mapping includes the first subset, the second subset, and a third subset. In some examples of the method 700 and the apparatus described herein, a first entry of the third subset may be identified using an LBA received in a read command, the entry of the first subset may be identified using the first entry of the third subset, a second entry of the second subset may be identified using the entry of the first subset, and a physical address of the memory system may be identified using the second entry of the second subset.

It should be noted that the methods described above describe possible implementations, and that the operations and the steps may be rearranged or otherwise modified and that other implementations are possible. Further, portions from two or more of the methods may be combined.

An apparatus is described. The apparatus may include a memory device, a controller coupled with the memory device and configured to cause the apparatus to receive a read command including an LBA, read, based at least in part on the LBA, an entry of a first subset of a mapping that defines a relationship between the LBA and a physical address, the entry including a flag that indicates whether the entry is associated with a second subset of the mapping or is associated with a starting physical address of a set of physical addresses associated with the read command, read data associated with the read command starting at the physical address based at least in part on the flag indicating that the entry is associated with the starting physical address, and transmit the data to a host system based at least in part on reading the data.

In some examples of the apparatus, physical addresses of the set of physical addresses may be consecutively indexed.

In some examples of the apparatus, the flag may be set to indicate that the entry may be associated with the starting physical address based at least in part on the physical addresses of the set of physical addresses being consecutively indexed.

In some examples of the apparatus, the controller may be further configured to cause the apparatus to transfer, from a non-volatile memory device to a volatile memory device, a portion of the first subset of the mapping including the entry of the first subset of the mapping, where reading the entry of the first subset of the mapping may be based at least in part on transferring the portion of the first subset of the mapping.

In some examples of the apparatus, the controller may be further configured to cause the apparatus to refrain from reading an entry of the second subset of the mapping based at least in part on the flag indicating that the entry may be associated with the starting physical address.

In some examples of the apparatus, the controller may be further configured to cause the apparatus to refrain from transferring, from a non-volatile memory device to a volatile memory device, at least a portion of the second subset of the mapping based at least in part on the flag indicating that the entry may be associated with the starting physical address.

In some examples of the apparatus, the controller may be further configured to cause the apparatus to read an entry of a third subset of the mapping that corresponds to the LBA, the entry of the third subset of the mapping the LBA to the entry of the first subset of the mapping, where reading the entry of the first subset of the mapping may be based at least in part on reading the entry of the third subset of the mapping.

In some examples of the apparatus, the controller may be further configured to cause the apparatus to receive a second read command including a second LBA, read, based at least in part on the second LBA, a second entry of the first subset of the mapping that defines a relationship between the second LBA and a second physical address, the second entry including a second flag that indicates whether the second entry may be associated with the second subset of the mapping or may be associated with a starting physical address of a set of physical addresses associated with the second read command, read, at the second physical address, an entry of the second subset of the mapping based at least in part on the flag indicating that the entry may be associated with the second subset of the mapping, the entry of the second subset of the mapping indicating a location of second data associated with the second read command, read the second data based at least in part on reading the entry of the second subset of the mapping, and transmit the second data to the host system based at least in part on reading the second data.

In some examples of the apparatus, the mapping includes the first subset, the second subset, and a third subset. In some examples of the apparatus, a first entry of the third subset may be identified using the LBA received in the read command, the entry of the first subset may be identified using the first entry of the third subset, a second entry of the second subset may be identified using the entry of the first subset, and a respective physical address of the memory device may be identified using the second entry of the second subset.

Another apparatus is described. The apparatus may include a memory device, a controller coupled with the memory device and configured to cause the apparatus to receive a write command for a set of physical addresses that are consecutively indexed, write data to the set of physical addresses in response to receiving the write command, and set, based at least in part on the set of physical addresses being consecutively indexed, a flag in an entry of a first subset of a mapping that defines a relationship between LBAs and physical addresses, the flag indicating whether the entry of the first subset of the mapping is associated with a second subset of the mapping or is associated with a starting physical address of the set of physical addresses.

In some examples of the apparatus, the controller may be further configured to cause the apparatus to set the entry of the first subset of the mapping to indicate the starting physical address based at least in part on the set of physical addresses being consecutively indexed.

In some examples of the apparatus, the controller may be further configured to cause the apparatus to receive a read command including an LBA, read, based at least in part on the LBA, the entry of the first subset of the mapping, read the data starting at the starting physical address of the set of physical addresses based at least in part on setting the flag to indicate that the entry may be associated with the starting physical address and reading the entry of the first subset of the mapping, and transmit the data to a host system based at least in part on reading the data.

In some examples of the apparatus, the controller may be further configured to cause the apparatus to add, based at least in part on writing the data to the set of physical addresses, a first set of entries to a first change log associated with updating entries of the mapping and a second set of entries to a second change log associated with updating entries of the mapping and set a second flag in the first change log or the second change log, or both, that indicates whether physical addresses associated with the first set of entries of the first change log may be consecutive with physical addresses associated with the second set of entries of the second change log.

In some examples of the apparatus, the controller may be further configured to cause the apparatus to receive a second write command for a second set of physical addresses, where one or more physical addresses of the second set may be non-consecutive with other physical addresses of the second set, write second data to the second set of physical addresses in response to receiving the second write command, and set a second flag in a second entry of the first subset of the mapping based at least in part on the second set of physical addresses being non-consecutive, the flag indicating that the second entry of the first subset of the mapping may be associated with the second subset of the mapping.

In some examples of the apparatus, the controller may be further configured to cause the apparatus to set the second entry of the first subset of the mapping to indicate a location of an entry of the second subset of the mapping based at least in part on the second set of physical addresses being non-consecutive.

In some examples of the apparatus, the controller may be further configured to cause the apparatus to set a third flag that identifies the one or more non-consecutive physical addresses.

In some examples of the apparatus, the mapping includes the first subset, the second subset, and a third subset. In some examples of the apparatus, a first entry of the third subset may be identified using an LBA received in a read command, the entry of the first subset may be identified using the first entry of the third subset, a second entry of the second subset may be identified using the entry of the first subset, and a physical address of the memory device may be identified using the second entry of the second subset.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:
   one or more memory devices; and
   processing circuitry coupled with the one or more memory devices and configured to cause the memory system to:
   receive a read command comprising a logical block address;
   read, based at least in part on the logical block address, an entry of a first subset of a mapping that defines a relationship between the logical block address and a physical address, the entry comprising a flag that indicates whether the entry is associated with a second subset of the mapping or is associated with a starting physical address of a set of physical addresses associated with the read command;
   read data associated with the read command starting at the physical address based at least in part on the flag indicating that the entry is associated with the starting physical address; and
   transmit the data to a host system based at least in part on reading the data.

2. The memory system of claim 1, wherein physical addresses of the set of physical addresses are consecutively indexed.

3. The memory system of claim 2, wherein the flag is set to indicate that the entry is associated with the starting physical address based at least in part on the physical addresses of the set of physical addresses being consecutively indexed.

4. The memory system of claim 1, wherein the processing circuitry is further configured to cause the memory system to:
   transfer, from a non-volatile memory device to a volatile memory device, a portion of the first subset of the mapping comprising the entry of the first subset of the mapping, wherein reading the entry of the first subset of the mapping is based at least in part on transferring the portion of the first subset of the mapping.

5. The memory system of claim 1, wherein the processing circuitry is further configured to cause the memory system to:
   refrain from reading an entry of the second subset of the mapping based at least in part on the flag indicating that the entry is associated with the starting physical address.

6. The memory system of claim 1, wherein the processing circuitry is further configured to cause the memory system to:
   refrain from transferring, from a non-volatile memory device to a volatile memory device, at least a portion of the second subset of the mapping based at least in part on the flag indicating that the entry is associated with the starting physical address.

7. The memory system of claim 1, wherein the processing circuitry is further configured to cause the memory system to:
   read an entry of a third subset of the mapping that corresponds to the logical block address, the entry of the third subset of the mapping the logical block address to the entry of the first subset of the mapping, wherein reading the entry of the first subset of the mapping is based at least in part on reading the entry of the third subset of the mapping.

8. The memory system of claim 1, wherein the processing circuitry is further configured to cause the memory system to:
   receive a second read command comprising a second logical block address;

read, based at least in part on the second logical block address, a second entry of the first subset of the mapping that defines a relationship between the second logical block address and a second physical address, the second entry comprising a second flag that indicates whether the second entry is associated with the second subset of the mapping or is associated with a starting physical address of a set of physical addresses associated with the second read command;
read, at the second physical address, an entry of the second subset of the mapping based at least in part on the flag indicating that the entry is associated with the second subset of the mapping, the entry of the second subset of the mapping indicating a location of second data associated with the second read command;
read the second data based at least in part on reading the entry of the second subset of the mapping; and
transmit the second data to the host system based at least in part on reading the second data.

9. The memory system of claim 1, wherein the mapping comprises the first subset, the second subset, and a third subset, and wherein a first entry of the third subset is identified using the logical block address received in the read command, the entry of the first subset is identified using the first entry of the third subset, a second entry of the second subset is identified using the entry of the first subset, and a respective physical address of the one or more memory devices is identified using the second entry of the second subset.

10. A non-transitory computer-readable medium storing code comprising instructions which, when executed by one or more processors of memory system, cause the memory system to:
receive a read command comprising a logical block address;
read, based at least in part on the logical block address, an entry of a first subset of a mapping that defines a relationship between the logical block address and a physical address, the entry comprising a flag that indicates whether the entry is associated with a second subset of the mapping or is associated with a starting physical address of a set of physical addresses associated with the read command;
read data associated with the read command starting at the physical address based at least in part on the flag indicating that the entry is associated with the starting physical address; and
transmit the data to a host system based at least in part on reading the data.

11. The non-transitory computer-readable medium of claim 10, wherein physical addresses of the set of physical addresses are consecutively indexed.

12. The non-transitory computer-readable medium of claim 11, wherein the flag is set to indicate that the entry is associated with the starting physical address based at least in part on the physical addresses of the set of physical addresses being consecutively indexed.

13. The non-transitory computer-readable medium of claim 10, wherein the instructions, when executed by the one or more processors of the memory system, further cause the memory system to:
transfer, from a non-volatile memory device to a volatile memory device, a portion of the first subset of the mapping comprising the entry of the first subset of the mapping, wherein reading the entry of the first subset of the mapping is based at least in part on transferring the portion of the first subset of the mapping.

14. The non-transitory computer-readable medium of claim 10, wherein the instructions, when executed by the one or more processors of the memory system, further cause the memory system to:
refrain from reading an entry of the second subset of the mapping based at least in part on the flag indicating that the entry is associated with the starting physical address.

15. The non-transitory computer-readable medium of claim 10, wherein the instructions, when executed by the one or more processors of the memory system, further cause the memory system to:
refrain from transferring, from a non-volatile memory device to a volatile memory device, at least a portion of the second subset of the mapping based at least in part on the flag indicating that the entry is associated with the starting physical address.

16. The non-transitory computer-readable medium of claim 10, wherein the instructions, when executed by the one or more processors of the memory system, further cause the memory system to:
read an entry of a third subset of the mapping that corresponds to the logical block address, the entry of the third subset of the mapping the logical block address to the entry of the first subset of the mapping, wherein reading the entry of the first subset of the mapping is based at least in part on reading the entry of the third subset of the mapping.

17. The non-transitory computer-readable medium of claim 10, wherein the instructions, when executed by the one or more processors of the memory system, further cause the memory system to:
receive a second read command comprising a second logical block address;
read, based at least in part on the second logical block address, a second entry of the first subset of the mapping that defines a relationship between the second logical block address and a second physical address, the second entry comprising a second flag that indicates whether the second entry is associated with the second subset of the mapping or is associated with a starting physical address of a set of physical addresses associated with the second read command;
read, at the second physical address, an entry of the second subset of the mapping based at least in part on the flag indicating that the entry is associated with the second subset of the mapping, the entry of the second subset of the mapping indicating a location of second data associated with the second read command;
read the second data based at least in part on reading the entry of the second subset of the mapping; and
transmit the second data to the host system based at least in part on reading the second data.

18. The non-transitory computer-readable medium of claim 10, wherein the mapping comprises the first subset, the second subset, and a third subset, and wherein a first entry of the third subset is identified using the logical block address received in the read command, the entry of the first subset is identified using the first entry of the third subset, a second entry of the second subset is identified using the entry of the first subset, and a respective physical address of the memory system is identified using the second entry of the second subset.

19. A method by a memory system, comprising:
receiving a read command comprising a logical block address;

reading, based at least in part on the logical block address, an entry of a first subset of a mapping that defines a relationship between the logical block address and a physical address, the entry comprising a flag that indicates whether the entry is associated with a second subset of the mapping or is associated with a starting physical address of a set of physical addresses associated with the read command;

reading data associated with the read command starting at the physical address based at least in part on the flag indicating that the entry is associated with the starting physical address; and transmitting the data to a host system based at least in part on reading the data.

20. The method of claim 19, wherein physical addresses of the set of physical addresses are consecutively indexed.

21. The method of claim 20, wherein the flag is set to indicate that the entry is associated with the starting physical address based at least in part on the physical addresses of the set of physical addresses being consecutively indexed.

22. The method of claim 20, further comprising:
transferring, from a non-volatile memory device to a volatile memory device, a portion of the first subset of the mapping comprising the entry of the first subset of the mapping, wherein reading the entry of the first subset of the mapping is based at least in part on transferring the portion of the first subset of the mapping.

23. The method of claim 20, further comprising:
refraining from reading an entry of the second subset of the mapping based at least in part on the flag indicating that the entry is associated with the starting physical address.

24. The method of claim 20, further comprising:
refraining from transferring, from a non-volatile memory device to a volatile memory device, at least a portion of the second subset of the mapping based at least in part on the flag indicating that the entry is associated with the starting physical address.

25. The method of claim 20, further comprising:
reading an entry of a third subset of the mapping that corresponds to the logical block address, the entry of the third subset of the mapping the logical block address to the entry of the first subset of the mapping, wherein reading the entry of the first subset of the mapping is based at least in part on reading the entry of the third subset of the mapping.

\* \* \* \* \*